Patented May 9, 1933

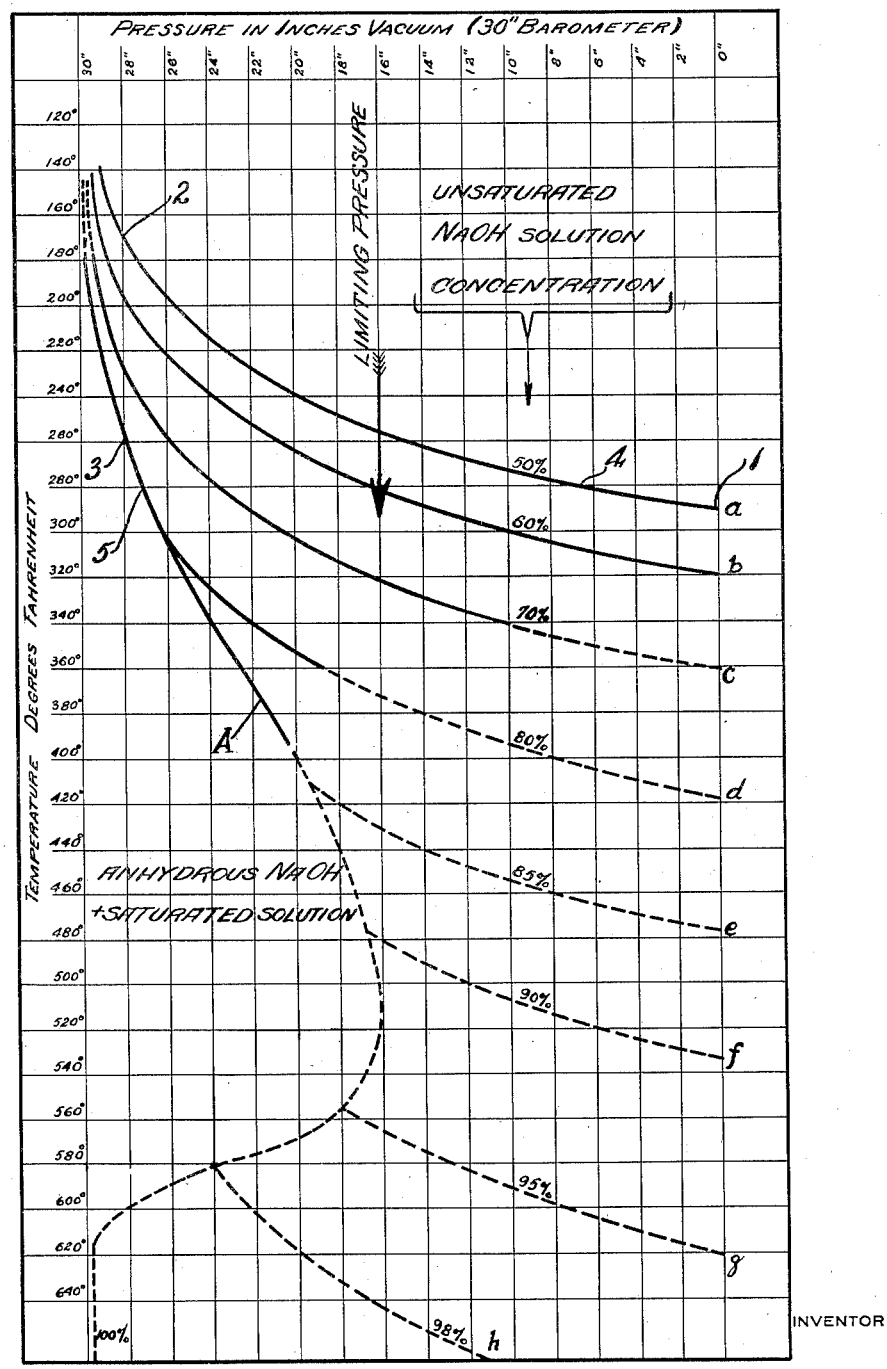

1,907,988

UNITED STATES PATENT OFFICE

GEORGE LYNN, OF WADSWORTH, AND RALPH WADSWORTH MILLER, OF BARBERTON, OHIO, ASSIGNORS TO PITTSBURGH PLATE GLASS COMPANY, OF PITTSBURGH, PENNSYLVANIA, A CORPORATION OF PENNSYLVANIA

PREPARATION OF ANHYDROUS CAUSTIC

Application filed June 4, 1931. Serial No. 542,058.

This invention relates to the production of solid anhydrous caustic soda from solutions thereof, its object being to provide a method of production which is more economical and less dangerous than the usual practice and which at the same time yields a product of higher purity with novel and advantageous physical characteristics.

Further objects of the invention are in part obvious and in part will appear more in detail hereinafter.

In the drawing, the view is a diagram illustrating conditions essential to proper practice of the present invention, now to be described in detail.

Our invention is based upon vacuum evaporation of caustic soda solutions, thereby gaining all advantages inherent from vacuum evaporation, not only avoiding high temperatures and consequent increased cost, but also decreasing corrosion of apparatus and danger to workmen. We have discovered that vacuum evaporation of caustic soda solutions, if properly performed, can be so conducted as to necessarily or inevitably cause the formation of anhydrous caustic soda crystals. It is a dependable process to that end. Our investigations have revealed the conditions necessary for dependable crystal formation, the results of such investigations in practice being illustrated in the drawing, where temperatures in degrees Fahrenheit have been plotted as abscissas and partial pressures of water vapor, or standard vacuum, in inches of mercury, as ordinates. We have found that the temperature pressure relationship of boiling 50% NaOH solution is represented by curve $a$; that of 60% NaOH solution by curve $b$; of 70% by curve $c$; and so on. More important, we have discovered, after scores of trials in practice, that these constant composition lines terminate in a line A at which crystalline anhydrous caustic soda is in equilibrium with the solution. That is to say, if at zero vacuum (atmospheric pressure) heat is applied to a 50% NaOH solution originally at room temperature, its temperature will rise. At about 290° F. (point 1 on chart) boiling begins. The solution becomes more concentrated, due to the water being evaporated, and the temperature continues to rise if sufficient heat is supplied. This process continues with no difference except in degree, until ultimately fused anhydrous NaOH is obtained. This succession of events is what happens in the usual pot operation of finishing caustic soda, requiring an extremely high temperature before a dry finished product is produced.

With our process, after 50% NaOH solution originally at room temperature is first placed under a vacuum of say 28 inches and heat is applied, the temperature will rise until, at about 170° (point 2 on the chart), boiling begins. Boiling continues as heat is applied, with increasing concentration of the liquor to a 60% solution at about 195°, to a 70% solution at about 230°, and when a temperature of 260° is reached (point 3 on curve A), the temperature ceases to rise with further addition of heat, and at this point anhydrous caustic soda crystals form in accordance with further evaporation of water from the solution. In other words, the crystals form as the water leaves and the solution remains at approximately 75% concentration until ultimately a dry product is produced, all without further change of temperature or pressure, which remain respectively at 260° and 28 inches.

Similarly, we have found that if a 50% NaOH solution at room temperature is heated say to 280°, and while this temperature is maintained constant a successively increased vacuum is applied, as the vacuum increases boiling begins at about 6 inches of vacuum (point 4 on the chart), and if the vacuum is further increased, boiling continues, the solution becomes more concentrated to 60% and then to 70%, until finally when the vacuum reaches a value of about 27 inches (point 5 on the chart) crystals of anhydrous NaOH appear and no further increase of vacuum occurs, theoretically, until all of the water has been evaporated and a solid has been produced.

Of course, the curve A represents the conditions respecting temperature and vacuum necessary to the continuing production of anhydrous caustic soda crystals, and when the respective conditions of temperature and vacuum represented by any point on the line A are reached, further attempts to increase the temperature or the vacuum beyond such values will have no other effect than to increase the production of caustic soda crystals, the solution remaining of the strength according to the lines $a$, $b$, $c$ and $d$ at the particular point on curve A representing the temperature and vacuum conditions.

The curve A may be regarded as very dependable through that portion indicated by the full line, to wit, from about 175° to say 400°. Between these limits we have demonstrated dependability of the values by many trials in practice, chiefly because the limits of 175° to, say, 400° include the most practical temperature and vacuum values. Beyond these limits the curve has been extrapolated from theoretical considerations and should be regarded as only approximately correct. Of course, the conditions of temperature and vacuum represented at any point on the curve A can be reached not only by holding the temperature constant and increasing the vacuum or holding the vacuum constant and increasing the temperature, but also by variations of both. In other words, there is an infinite number of temperature and vacuum variation paths which can be followed in order to reach conditions on curve A, of which the continuance necessarily produces anhydrous caustic soda crystals, and we do not restrict the practice of this invention to any particular evaporation path, the essential point of the invention being the continuation of evaporation after a point on curve A has been reached, with the simultaneous crystallization of anhydrous caustic soda.

Between about 145° F. and 400° F. the course of curve A is given fairly accurately by the empirical equation $$P = 31.5 - 0.0175t + 1.04 \times 10^{-4}t^2 - 3.4 \times 10^{-7}t^3$$

in which $P$ = inches of mercury vacuum relative to 30 inches standard, and $t$ = degrees Fahrenheit. This particular equation has no special significance other than that it is an empirical equation prepared or chosen from the mathematical standpoint to represent the actual curve A with sufficient accuracy for all practical purposes. We prefer to operate in this range, but because the curve A follows approximately the course shown by the dotted extensions at higher temperatures, evaporation with simultaneous anhydrous caustic crystal formation is possible at any vacuum greater than the highest point of the curve or, in other words, at any vacuum greater than 16 inches, which is the vacuum at approximately 510°.

In the practice of this invention, the solution to be evaporated may be held in any suitable vessel by means of which proper heat and vacuum may be applied to the solution. The process may be carried out, for example, in a closed vessel suitably subjected to heat with vacuum applied to its interior until the entire mass of the solution is converted to anhydrous caustic soda crystals, whereupon the vessel may be opened and the solid crystal mass removed and broken up or powdered for use if necessary or desirable. On the other hand, continuous operation may be desirable, in which case an evaporator may be employed equipped for mechanical circulation of the liquid and for economical application of heat, such as by steam circulating pipes. An evaporator with a circulating propeller in a well is suitable because of the increased tendency to produce separate and distinct crystals instead of islands of crystals which clog the circulating system. Moreover, with such an evaporator the operation may be carried out continuously with continuous feed of 50% liquor to the evaporator and simultaneously therewith the withdrawal of a more concentrated solution containing anhydrous caustic soda crystals, from which the crystals are separated in any suitable manner with the mother liquor returned to the evaporator. Such a practice tends to produce a very pure product because the crystals "freeze" out from the solution, leaving impurities behind in the mother liquor, which, of course, remains at the concentration represented by the working point on curve A. This mother liquor ultimately collects more and more of the impurities and when the value of the impurities reaches a maximum it must itself be specially treated for removal of the impurities or replaced by fresh liquor.

The crystals can be removed by filtration or in a centrifugal separator, but in any case the separating operation is preferably carried out at approximately the same temperature at which the crystals were formed, to avoid the additional production of crystals during the separating operation by any reduction of the temperature. The same reason dictates jacketing of circulating pipes to prevent freezing of the solution therein or the deposit of crystals such as might require removal by the use of steam or the like. Examples of operations practicing the invention are as follows:

*Example 1.*—100 pounds of feed liquor of the analysis given below were so evaporated that there remained 62.5 pounds of slurry, at 250° F. and 28.4 inches standard vacuum. On centrifuging this slurry, there were obtained about 10 pounds of crystals and 52.5 pounds of mother liquor of the analysis shown:

|  |  | Feed | Crystals | Filtrate |
|---|---|---|---|---|
| % Water | | 49.24 | 4.15 | 24.09 |
| % Solids | | 50.76 | 95.85 | 75.91 |
| Analysis of solids | % NaOH | 98.80 | 99.34 | 98.10 |
| | % Na$_2$CO$_3$ | .74 | .55 | 1.24 |
| | % NaCl | .33 | .08 | .48 |
| | % Na$_2$SO$_4$ | .13 | .03 | .18 |

The ratio of crystals to feed need not be just that shown in this example, but can be increased to any extent as long as the slurry will circulate. In fact, in an appropriate apparatus, all the water might be evaporated, if desired.

*Example 2.*—Feed of the same analysis as that in Example 1, was evaporated in the same manner, except that the temperature and pressure were about 260° F. and 27.8 inches vacuum respectively. The crystals and filtrate analyzed:

|  |  | Crystals | Filtrate |
|---|---|---|---|
| % Water | | 4.04 | 22.46 |
| % Solids | | 95.96 | 77.54 |
| Analysis of solids | % NaOH | 99.51 | 98.38 |
| | % Na$_2$CO$_3$ | .49 | 1.01 |
| | % NaCl | .08 | .40 |
| | % Na$_2$SO$_4$ | .02 | .21 |

The crystals thus obtained are flaky and have a large surface, relative to their mass. Their apparent bulk density is quite low, about 40 pounds per cubic foot. Both of these are new and desirable features in commercial caustic soda. The few percent of water in the crystal mass does not cause a wet product when cooled to room temperature, for the mother liquor remaining on the crystals solidifies at about 145° F. to an eutectic mixture of anhydrous and monohydrate crystals.

For the purpose of reducing the cost of heating as well as to avoid undesirable deposit of crystals, such as in the circulating pipes, etc., we prefer to work at as low a temperature as is feasible, a further advantage of low temperatures being the lower solubility of caustic at low temperatures. As a result, temperatures toward the lower limit of 145° are more desirable than those toward the upper limit of 400°, although the lower temperatures of course require a higher vacuum.

The pressures indicated on the chart refer of course to partial pressures of water vapors. If any other gas or vapor such as air is present, the total pressure has no significance on the chart. Therefore, assuming evaporation of a 70% caustic solution at 300° F. in a vacuum pan, from the chart it will be seen that the operation will require approximately 20 inches of vacuum. Should this pan be suddenly opened to the atmosphere, the temperature and composition remaining constant, the total pressure, of course, rises to one atmosphere. However, the partial pressure of water vapor remains where it was before, at 20 inches of vacuum. The effect of the extra air pressure on the liquid phase will be practically nil.

In the practice of the continuous process before mentioned, where the mother liquor from the centrifugal slurry of crystals is returned to the evaporator, it is possible to send the mother liquor or filtrate to a second evaporating pan where a crop of crystals of slightly less purity is obtained, and then from the second pan to a third pan where crystals of still less purity are obtained. The final impure product can then be used for making the so-called 60% Na$_2$O caustic by adding the requisite amount of salt cake. Thus the impurities may be largely concentrated in this lower test product where they are not objectionable.

This method is a material improvement over the ordinary practice of producing anhydrous caustic soda in open pots because it avoids attack of the pots by the strong solutions and high temperatures and high replacement cost for pots. In addition, in the old pot method the corrosion products contaminate the caustic so that it is necessary to treat it with sulfur at high temperatures to precipitate impurities, a practice which is also avoided. Again, the escape of caustic sprays into the atmosphere or other operating conditions dangerous to the workmen are avoided. Again, pots used in ordinary practice finish from four to seven tons of NaOH per day, and larger sizes have proved impracticable, whereas our invention may be carried out in units of ten times this capacity. Finally, the product is crystalline and grinding is not necessary, while its ability to absorb gases and to dissolve are of a high order.

What we claim is:

1. In a process of the type described for separating caustic and water from an aqueous caustic solution, that step which comprises the simultaneous evaporation of water under a vacuum of a value greater than approximately sixteen inches of mercury and crystallization of anhydrous caustic.

2. A process of the type described for separating anhydrous caustic from a water solution, comprising simultaneously evaporating water and crystallizing anhydrous caustic under a vacuum of a value greater than approximately sixteen inches of mercury, and separating the caustic crystals from the mother liquor.

3. A process of the type described for separating anhydrous caustic from a water solution, comprising heating a caustic solution under a vacuum of a value greater than approximately 16 inches of mercury, removing the vapor as fast as it forms, and continuing this operation after the temperature ceases to rise further, whereby anhydrous caustic crystals are formed.

4. A process of the type described for separating anhydrous caustic from a water solution, comprising applying an increasing vacuum to a caustic solution at a temperature greater than 145° F., whereby the vapor is removed as formed and the concentration of the caustic is increased, and continuing this process beyond the point at which the vacuum ceases to rise, whereby anhydrous caustic crystals are formed.

5. A process of the character described, comprising the vacuum evaporation of caustic soda under such conditions that the vacuum and temperature are substantially given by the equation:

$$P = 31.5 - 0.0175t + 1.04 \times 10^{-4}t^2 - 3.4 \times 10^{-7}t^3$$

between the temperatures of 145° and 400° F., and continuing the evaporation under such conditions, with simultaneous formation of anhydrous caustic crystals.

6. A process of the character described, comprising the simultaneous evaporation and crystallization of a caustic soda solution under a vacuum and temperature substantially given by the equation:

$$P = 31.5 - 0.0175t + 1.04 \times 10^{-4}t^2 - 3.4 \times 10^{-7}t^3$$

between the temperatures of 145° and 400° F., and separating the resulting crystals from the mother liquor.

7. A process for producing substantially anhydrous caustic soda of increased purity, which comprises evaporating water and simultaneously crystallizing anhydrous caustic from a caustic soda solution under the conditions of temperature and vacuum given by the equation:

$$P = 31.5 - 0.0175t + 1.04 \times 10^{-4}t^2 - 3.4 \times 10^{-7}t^3$$

between the temperatures of 145° and 400° F., separating the mother liquor from the crystals while substantially maintaining their temperature, and cooling the crystals to room temperature.

8. A process of producing anhydrous caustic from solutions thereof, consisting in applying to the solution a vacuum effect at a value greater than approximately sixteen inches of mercury and a heating effect at a temperature greater than 145° F., increasing at least one of said effects, until stable conditions are reached, and continuing the process for the production of anhydrous caustic crystals.

9. A process of the character described in claim 8 in which the vacuum effect is increased to stable conditions.

10. A process of the character described in claim 8 in which the heating effect is increased to stable conditions.

11. A process of the character described in claim 8 in which both of the heating and vacuum effects are increased to stable conditions.

In testimony whereof we hereby affix our signatures.

GEORGE LYNN.
RALPH WADSWORTH MILLER.